(12) United States Patent
Sung

(10) Patent No.: US 11,960,810 B2
(45) Date of Patent: Apr. 16, 2024

(54) CHIP, LAYOUT DESIGN SYSTEM, AND LAYOUT DESIGN METHOD

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 291 days.

(21) Appl. No.: 17/474,085

(22) Filed: Sep. 14, 2021

(65) Prior Publication Data

US 2022/0092250 A1 Mar. 24, 2022

(30) Foreign Application Priority Data

Sep. 22, 2020 (TW) ................. 109132712

(51) Int. Cl.
*G06F 30/30* (2020.01)
*G06F 30/392* (2020.01)
*G06F 119/06* (2020.01)
*G06F 119/08* (2020.01)

(52) U.S. Cl.
CPC ........ *G06F 30/392* (2020.01); *G06F 2119/06* (2020.01); *G06F 2119/08* (2020.01)

(58) Field of Classification Search
CPC ............... G06F 30/392; G06F 2119/06; G06F 2119/08; Y02D 10/00
See application file for complete search history.

(56) References Cited

U.S. PATENT DOCUMENTS

| 4,924,111 | A | 5/1990 | Anderson et al. |
| 11,682,455 | B2* | 6/2023 | Miyazaki ........... G11C 13/0026 365/148 |
| 2012/0209559 | A1* | 8/2012 | Brower ................. G05B 15/02 327/512 |
| 2020/0134120 | A1* | 4/2020 | Lo ......................... G06F 30/398 |

OTHER PUBLICATIONS

OA letter of the counterpart TW application (appl. no. 109132712) mailed on Oct. 4, 2021. Summary of the OA letter: 1.Claims 1-6 and Claims 7-10 are objected for lack of unity of invention. Both of claims 1-6 and claims 7-10 have special technical feature(s) over cited reference 1 (U.S. Pat. No. 4,924,111), but special technical feature(s) of claims 1-6 is not the same as or is not corresponding to special technical feature(s) of claims 7-10. 2.Claims 1-6 are allowable. 3.Claims 7-10 are not fully examined due to the objection for lack of unity of invention.

* cited by examiner

*Primary Examiner* — Jack Chiang
*Assistant Examiner* — Brandon Bowers
(74) *Attorney, Agent, or Firm* — WAPT, PC

(57) ABSTRACT

A chip includes a first circuitry and a second circuitry. The first circuitry includes first circuits which have first power consumption at a point of time. The second circuitry includes second circuits which have second power consumption at the point of time, and the first power consumption is higher than the second power consumption. At least one of the first circuits and at least one the second circuits are alternately arranged, in order to lower an operating temperature of the plurality of first circuits at the point of time.

14 Claims, 6 Drawing Sheets

CHIP, LAYOUT DESIGN SYSTEM, AND LAYOUT DESIGN METHOD

BACKGROUND

1. Technical Field

The present disclosure relates to a chip. More particularly, the present disclosure relates to a chip with built-in heat sink(s), a layout design system, and a layout design method.

2. Description of Related Art

In the layout of an existing integrated circuit, circuits having the same functions are commonly arranged together. In practical applications, if the circuits having the same functions operate simultaneously, a temperature of a portion of the chip may be too high, which results in a damage to the chip. In order to avoid such damage, additional heat sink(s) are required to lower the temperature of the chip. As a result, additional costs are caused.

SUMMARY

In some aspects of the present disclosure, a chip includes a first circuitry and a second circuitry. The first circuitry includes a plurality of first circuits, in which the plurality of first circuits have first power consumption at a point of time. The second circuitry includes a plurality of second circuits, in which the plurality of second circuits have second power consumption at the point of time, and the first power consumption is higher than the second power consumption. At least one of the plurality of first circuits and at least one the plurality of second circuits are alternately arranged, in order to lower an operating temperature of the plurality of first circuits at the point of time.

In some aspects of the present disclosure, a layout design system includes at least one memory circuit and at least one processor circuit. The at least one memory circuit is configured to store at least one program code, a temperature threshold value, and application data. The at least one processor circuit is configured to perform the at least one program code to: select a plurality of first layout patterns and a plurality of second layout patterns according to the application data, in which the plurality of first layout patterns correspond to a plurality of first circuits in a first circuitry, and the plurality of second layout patterns correspond to a plurality of second circuits in a second circuitry; alternately arrange at least one of the plurality of first layout patterns and at least one of the plurality of second layout patterns, in order to generate first layout data corresponding to a chip; determine whether an operating temperature of the chip is lower than the temperature threshold value according to the first layout data; and if the operating temperature is lower than the temperature threshold value, output the first layout data, in order to fabricate the chip according to the first layout data.

In some aspects of the present disclosure, a layout design method includes the following operations: selecting a plurality of first layout patterns and a plurality of second layout patterns according to application data, in which the plurality of first layout patterns correspond to a plurality of first circuits in a first circuitry, and the plurality of second layout patterns correspond to a plurality of second circuits in a second circuitry; alternately arranging at least one of the plurality of first layout patterns and at least one of the plurality of second layout patterns, in order to generate first layout data corresponding to a chip; determining whether an operating temperature of the chip is lower than a temperature threshold value according to the first layout data; and if the operating temperature is lower than the temperature threshold value, outputting the first layout data, in order to fabricate the chip according to the first layout data.

These and other objectives of the present disclosure will be described in preferred embodiments with various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
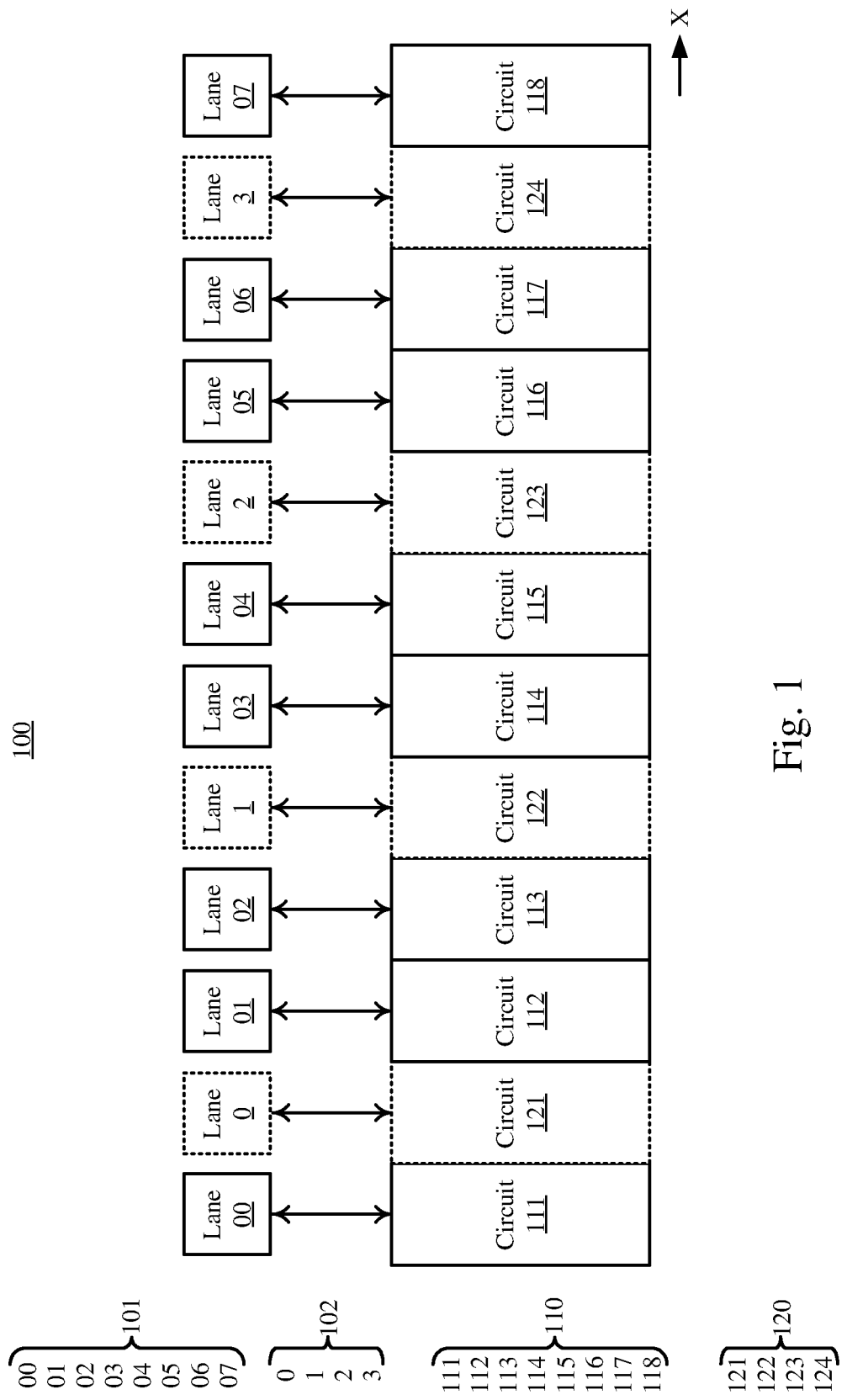
FIG. 1 is a schematic diagram of a chip according to some embodiments of the present disclosure.

FIG. 1 is a schematic diagram of a chip 100 according to some embodiments of the present disclosure. The chip 100 includes a circuitry 110 and a circuitry 120. The circuitry 110 includes circuits 111-118 (illustrated with solid lines), and the circuitry 120 includes circuits 121-124 (illustrated with dotted lines). In some embodiments, the circuits 111-118 have first power consumption (e.g., P1 shown in FIG. 2A or FIG. 2B) at a specific point of time (hereinafter referred to as "point of time T1"), the circuits 121-124 have second power consumption (e.g., P2 shown in FIG. 2A or FIG. 2B) at the point of time T1, and the first power consumption is different from (e.g., higher than) the second power consumption.

In some embodiments, the circuitry 110 is a receiver circuitry that is connected to a transmission interface 101, the circuitry 120 is a receiver circuitry that is connected to a transmission interface 102, and the transmission interface 101 is different from the transmission interface 102. For example, the transmission interface 101 is a V-by-one interface, and the circuits 111-118 may be respectively coupled to lanes 00-07 in the transmission interface 101, in order to receive image data via the V-by-one interface. The transmission interface 102 is a high definition multimedia interface (HDMI), and the circuits 121-124 may be respectively coupled to lanes 0-3 in the transmission interface 102, in order to receive image data and/or audio data via the HDMI.

Figure 2A:
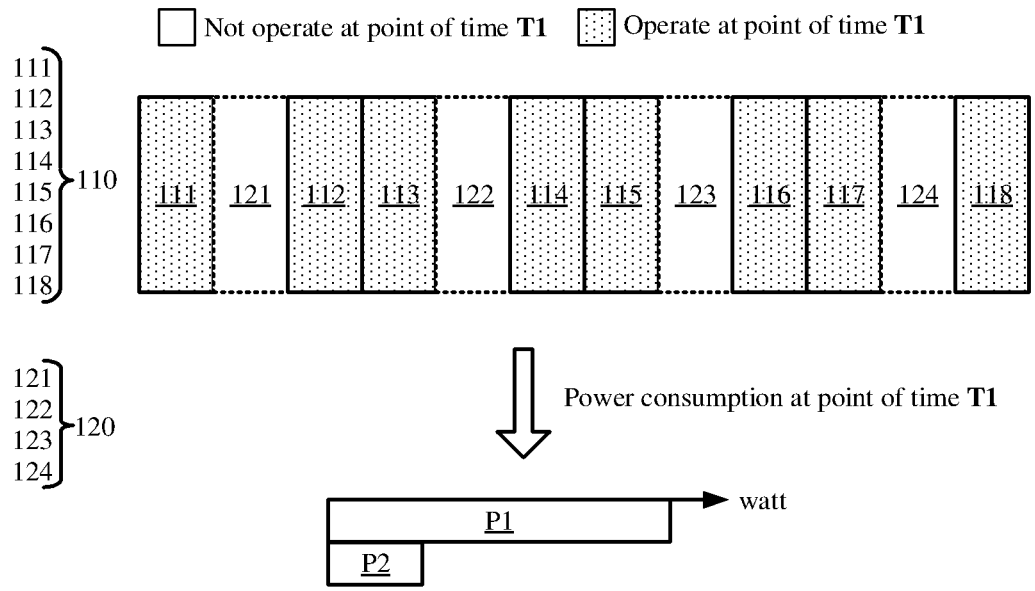
FIG. 2A is a schematic diagram showing a first operating case of the chip in FIG. 1 according to some embodiments of the present disclosure.

In some embodiments, the chip 100 may have two operating cases. Reference is made to FIG. 2A, and FIG. 2A is a schematic diagram showing a first operating case of the chip 100 in FIG. 1 according to some embodiments of the present disclosure. In the first operating case, the chip 100 is configured to receive image data from an external signal source (not shown in the figure) via the transmission interface 101. In this case, the circuits 111-118 operate at the point of time T1 (shown with dots), in order to receive the image data from the external signal source via the transmission interface 101. In some embodiments, the point of time T1 may be any point of time in the course of the circuits 111-118 receiving the image data from the external signal source. Correspondingly, the circuits 121-124 do not operate at the point of time T1. Accordingly, it is understood that, in the first operating case, the first power consumption P1 of the circuits 111-118 at the point of time T1 is higher than the second consumption P2 of the circuits 121-124 at the point of time T1.

Figure 2B:
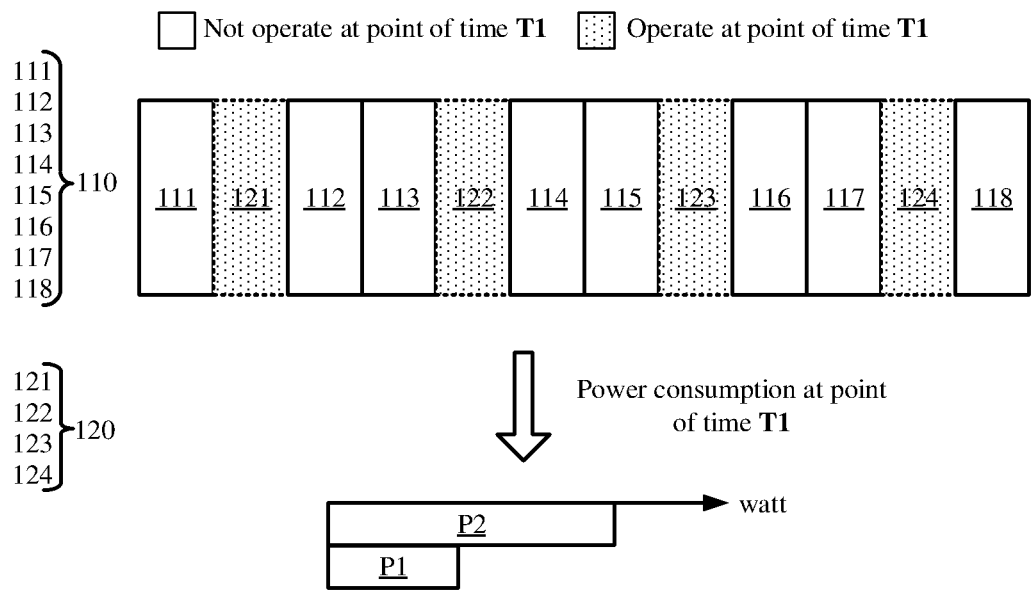
FIG. 2B is schematic diagram showing a second operating case of the chip in FIG. 1 according to some embodiments of the present disclosure.

FIG. 2B is schematic diagram showing a second operating case of the chip 100 in FIG. 1 according to some embodiments of the present disclosure. In the second operating case, the chip 100 is configured to receive image data and/or audio data from an external signal source via the transmission interface 10. In this case, the circuits 121-124 operate at the point of time T1 (shown in dots), in order to receive the image data and/or the audio data from the external signal source via the transmission interface 102. In some embodiments, the point of time T1 may be any point of time in the course of the circuits 121-124 receiving the image data and/or the audio data from the external signal source. Correspondingly, the circuits 111-118 do not operate at the point of time T1. Accordingly, it is understood that, in the second operating case, the power consumption P2 of the circuits 121-124 at the point of time T1 is higher than the power consumption P1 of the circuits 111-118 at the point of time T1.

With continued reference to FIG. 1, in some embodiments, at least one of the circuits 111-118 and at least one of the circuits 121-124 are alternately arranged. For example, the circuit 111, the circuit 121, the circuits 112-113, the circuit 122, the circuits 114-115, the circuit 123, the circuits 116-117, the circuit 124, and the circuit 118 are sequentially arranged along a direction of X.

As a result, when the circuits 111-118 operate (e.g., the first operating case in FIG. 2A), the circuits 121-124, which do not operate, may operate as heat sinks for the circuits 111-118, in order to lower operating temperature of the circuits 111-118. Similarly, when the circuits 121-124 operate (e.g., the second operating case in FIG. 2B), the circuits 111-118, which do not operate, may operate as heat sinks for the circuits 121-124, in order to lower operating temperature of the circuits 121-124.

Figure 2C:
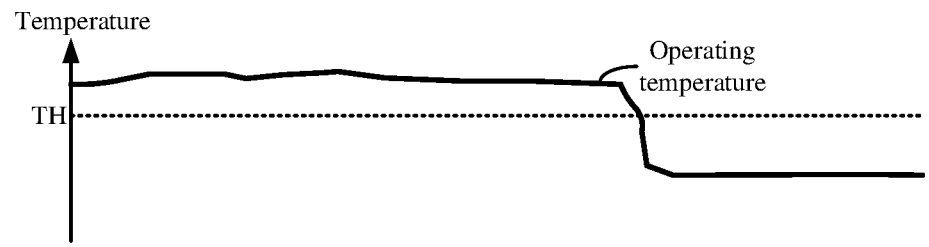
FIG. 2C is a schematic diagram of a functional layout and its operating temperature according to some related approaches.
Figure 2C:
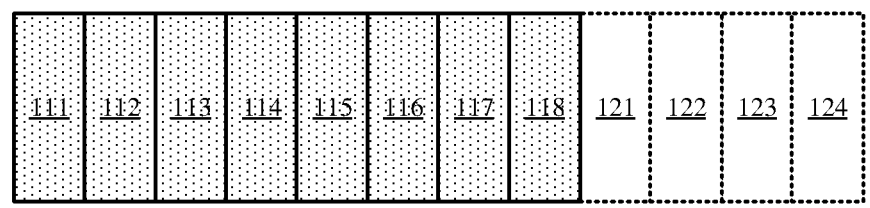
Figure 2C:
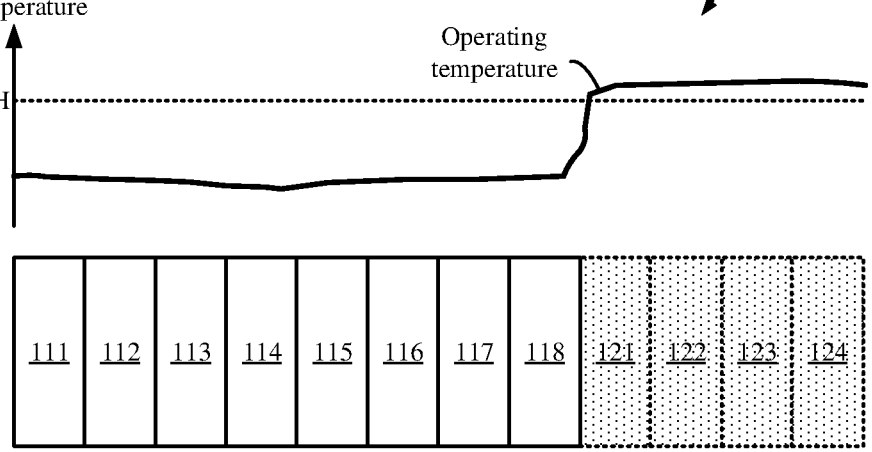

FIG. 2C is a schematic diagram of a functional layout and its operating temperature according to some related approaches. In some related approaches, a main consideration for a layout design of a chip is functionality. In these approaches, circuits having the same function are arranged together (i.e. arranged adjacent to each other.

For example, as shown in FIG. 2C, the circuits 111-118 having the same function are all arranged together, and the circuits 121-124 having the same function are all arranged together. In these approaches, when the circuits 111-118 operate and the circuits 121-124 do not operate (i.e., the aforementioned first operating case), thermal energy generated from the circuits 111-118 will concentrate in locations of the circuits 111-118. As a result, the operating temperature of the chip will exceed a temperature threshold value TH, which results in a lower reliability of the chip. In some embodiments, the temperature threshold value TH is an upper limit value of the temperature at which the chip is able to operate properly. Similarly, in these approaches, when the circuits 121-124 operate and the circuits 111-118 do not operate (i.e., the aforementioned second operating case), thermal energy generated from the circuits 121-124 will concentrate in locations of the circuits 121-124. As a result, the operating temperature of the chip will exceed the temperature threshold value TH, which results in a low reliability of the chip. In order to avoid low reliability, in these approaches, additional heat sinks are required to be employed to lower the operating temperature of the chip, which results in additional cost.

Figure 2D:
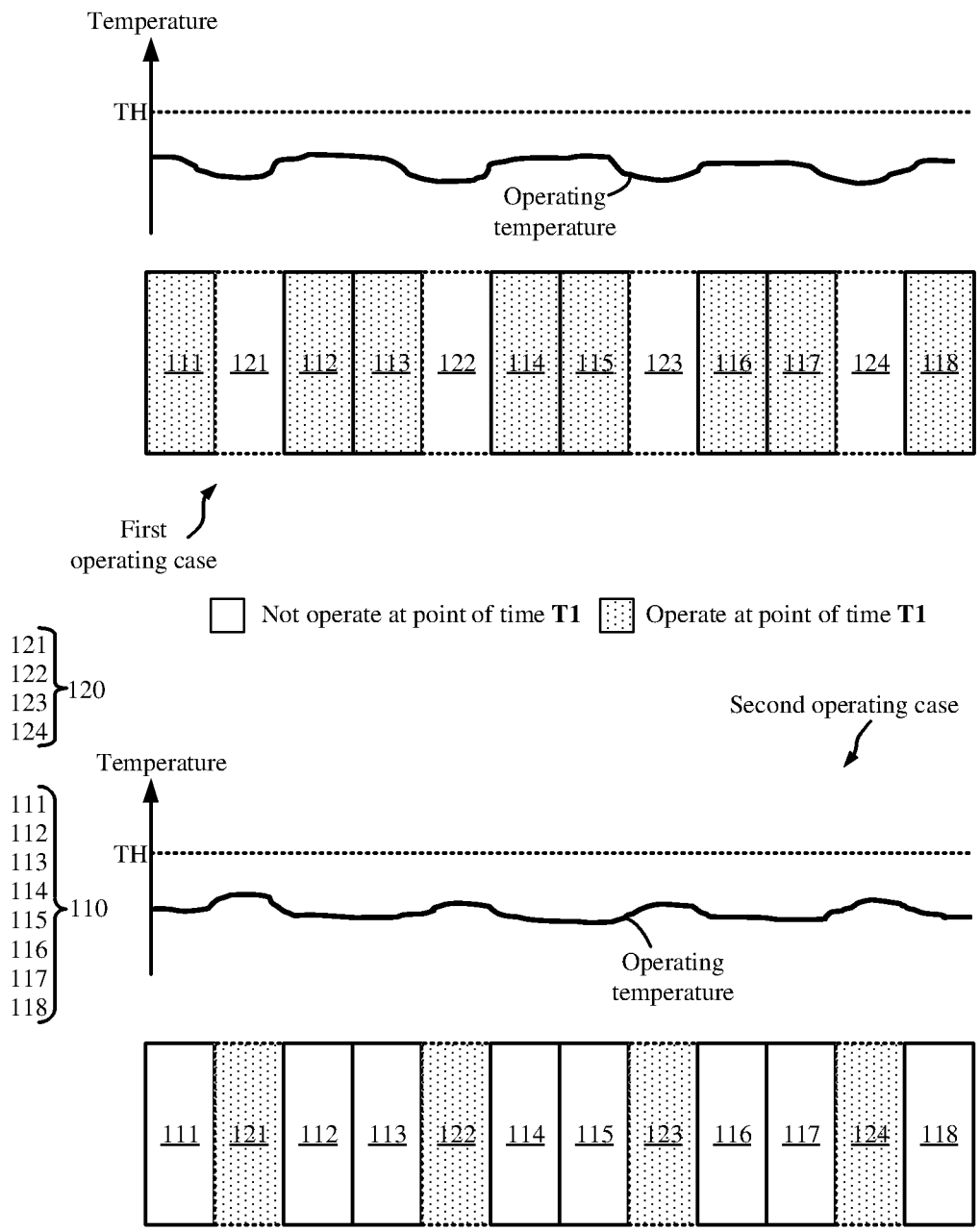
FIG. 2D is a schematic diagram showing the operating temperature of the chip 100 in FIG. 1 in the first operating case and the second operating case according to some embodiments of the present disclosure.

FIG. 2D is a schematic diagram showing the operating temperature of the chip 100 in FIG. 1 in the first operating case and the second operating case according to some embodiments of the present disclosure. Compared with the these approaches, with the alternate arrangements, when the circuits 111-118 operate and the circuits 121-124 do not operate (i.e., the aforementioned first operating case), thermal energy from the circuits 111-118 may be transferred to the adjacent circuits 121-124, such that the operating temperature of the chip 100 can be lower than the temperature threshold value TH. Similarly, when the circuits 121-124 operate and the circuits 111-118 do not operate (i.e., the aforementioned second operating case), thermal energy from the circuits 121-124 may be transferred to the adjacent circuits 111-118, such that the operating temperature of the chip 100 may be lower than the temperature threshold value TH. As a result, the chip 100 may operate in a proper temperature range without addition heat sink(s).

The above types of the circuitry 110, the circuitry 120, the transmission interface 101, and the transmission interface 102 are given for illustrative purposes, and the present disclosure is not limited thereto. Various types of the circuitry 110, the circuitry 120, the transmission interface 101, and the transmission interface 102 are within the contemplated scope of the present disclosure. The above numbers of the circuits 111-118, the circuits 121-124, the lance 00-08, and the lanes 0-3 are given for illustrative purposes, and the present disclosure is not limited thereto. Various numbers of circuits and those of lanes are within the contemplated scope of the present closure.

Examples of the first operating case and the second operating case are given for illustrative purposes, and the present disclosure is not limited thereto. In some other embodiments, the circuitry 110 and the circuitry 120 in FIG. 2A to FIG. 2D all operate at the point of time T1, and the power consumption P1 of the circuitry 110 at the point of time T1 is higher than (or lower than) the power consumption P2 of the circuitry 120 at the point of time T1. As a result, the circuitry 110 (or 120) having lower power consumption is able to operate as a heat sink for the circuitry 120 (or 110) having higher power consumption at the point of time T1.

Figure 3:
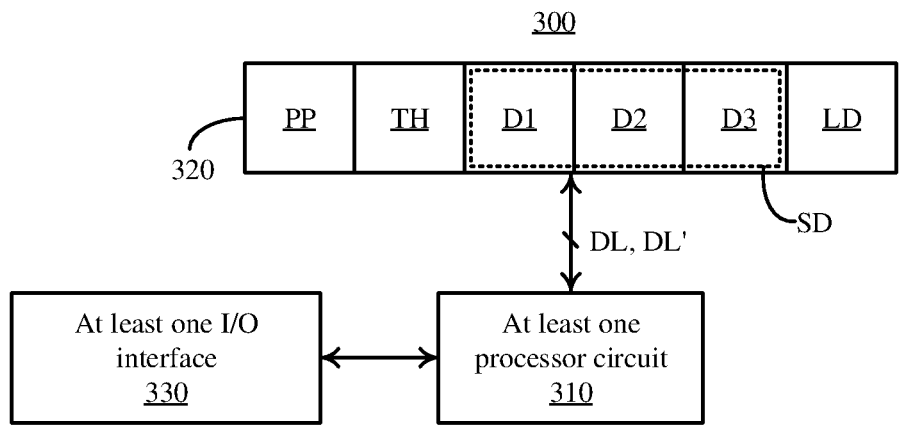
FIG. 3 is a schematic diagram of a layout design system according to some embodiments of the present disclosure.

FIG. 3 is a schematic diagram of a layout design system 300 according to some embodiments of the present disclosure. The layout design system 300 includes at least one processor circuit 310, at least one memory circuit 320, and at least one input/output (I/O) interface 330.

The at least one processor circuit 310 is coupled to the at least one memory circuit 320 and the at least one I/O interface 330. In various embodiments, the at least one processor circuit 310 may be a central processing unit (CPU), an application-specific integrated circuit (ASIC), a multicore processor circuit, a distributed processing system, or the like. Various circuits or systems able to implement the at least one processor circuit 310 are within the contemplated scope of the present disclosure.

The at least one memory circuit 320 stores at least one program code PP, which is configured to aid design of layout of integrated circuit(s). The at least one processor circuit 310 may execute the at least one program code PP, and operations (e.g., operations S410, S420, S430, S440, and S450 in FIG. 4) of generating first layout data DL (and/or the at least one second layout data DL') for fabricating the chip 100 can be executed automatically.

In some embodiments, the at least one memory circuit 320 further stores the temperature threshold value TH, application data SD, and a layout pattern database LD. The application data SD includes expected operation information about the chip 100, which may be generated in advance through circuit simulation. For example, the application data SD includes power consumption information D1, power consumption information D2, and operation information D3. The power consumption information D1 indicates the power consumption P1 of the circuitry 110 at the point of time T1. The power consumption information D2 indicates the power consumption P2 of the circuitry 120 at the point of time T1. The operation information D3 indicates an operating case (e.g., the first operating case in FIG. 2A or the second operating case in FIG. 2B) of the circuitry 110 and the circuitry 120. For example, the operation information D3 may indicate that when one of the circuitry 110 (i.e., the circuits 111-118) and the circuitry 120 (i.e., the circuits 121-124) operates at the point of time T1, another one of the circuitry 110 and the circuitry 120 does not operate at the point of time T1. Alternatively, in some other embodiments, the operation information D3 may indicate that both of the circuitry 110 (i.e., the circuits 111-118) and the circuitry 120 (i.e., the circuits 121-124) operate at the point of time T1.

Figure 5:
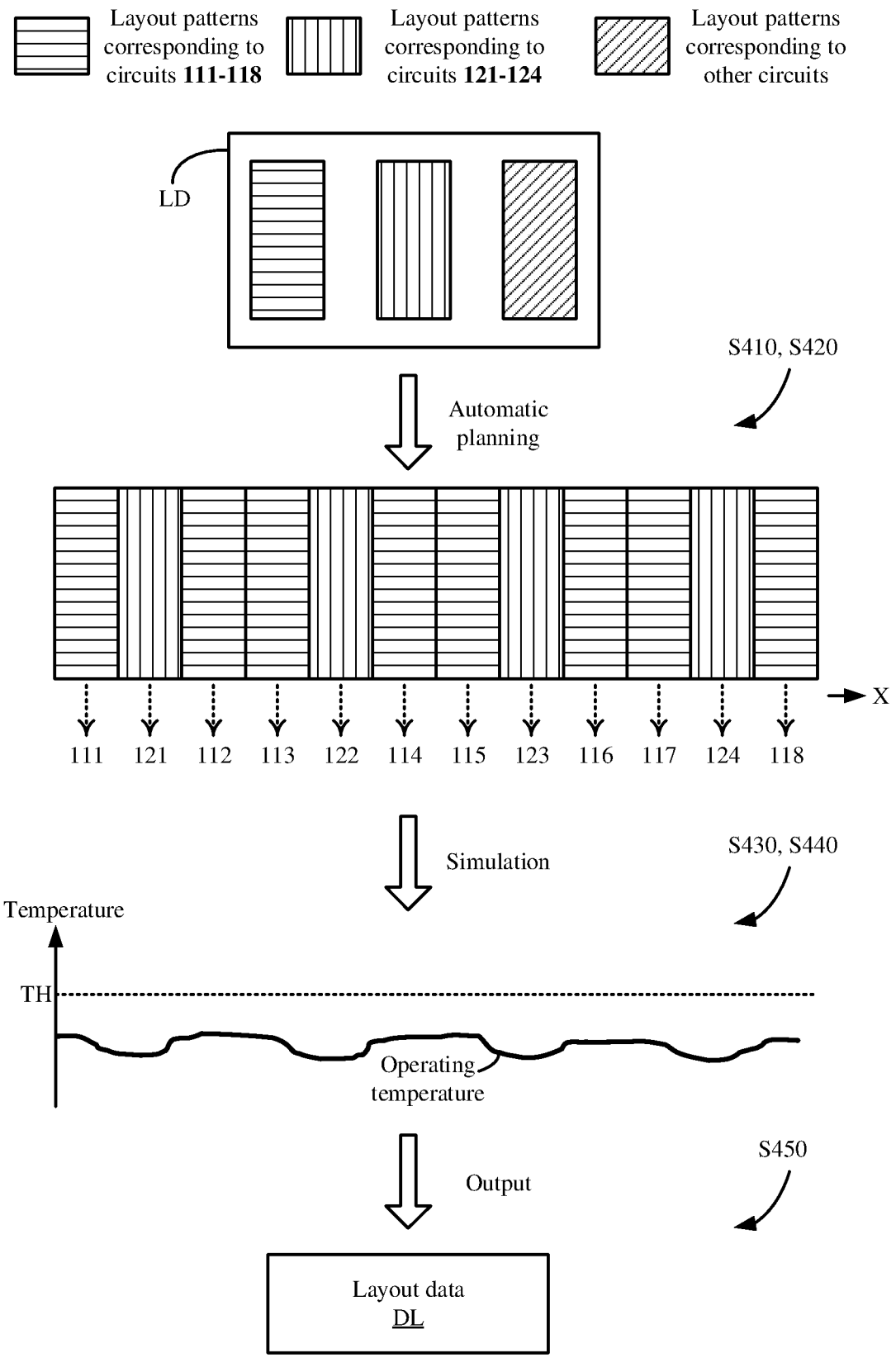
FIG. 5 is a schematic diagram showing a concept of operations in FIG. 4 according to some embodiments of the present disclosure.

The layout pattern database LD stores data of layout patterns corresponding to the circuits 111-118, layout patterns corresponding to the circuits 121-124, and/or layout patterns corresponding to other circuits (as shown in FIG. 5). The at least one processor circuit 310 may select proper layout pattern(s) from the layout pattern database LD according to the power consumption information D1, the power consumption information D2, and the operation information D3, and arrange the selected layout pattern(s) according to the temperature threshold value TH, in order to generate the first layout data DL (or the at least one second layout data DL) that meets a temperature requirement. In some other embodiments, the at least one memory circuit 320 may further store other information of layout constraints(s). As a result, the at least one processor circuit 310 may generate the proper first layout data DL (or the at least one second layout data DL) according to the layout constraint(s). For example, the layout constraint(s) may be, but not limited to, circuit area, a temperature lower limit value, and so on.

Figure 4:
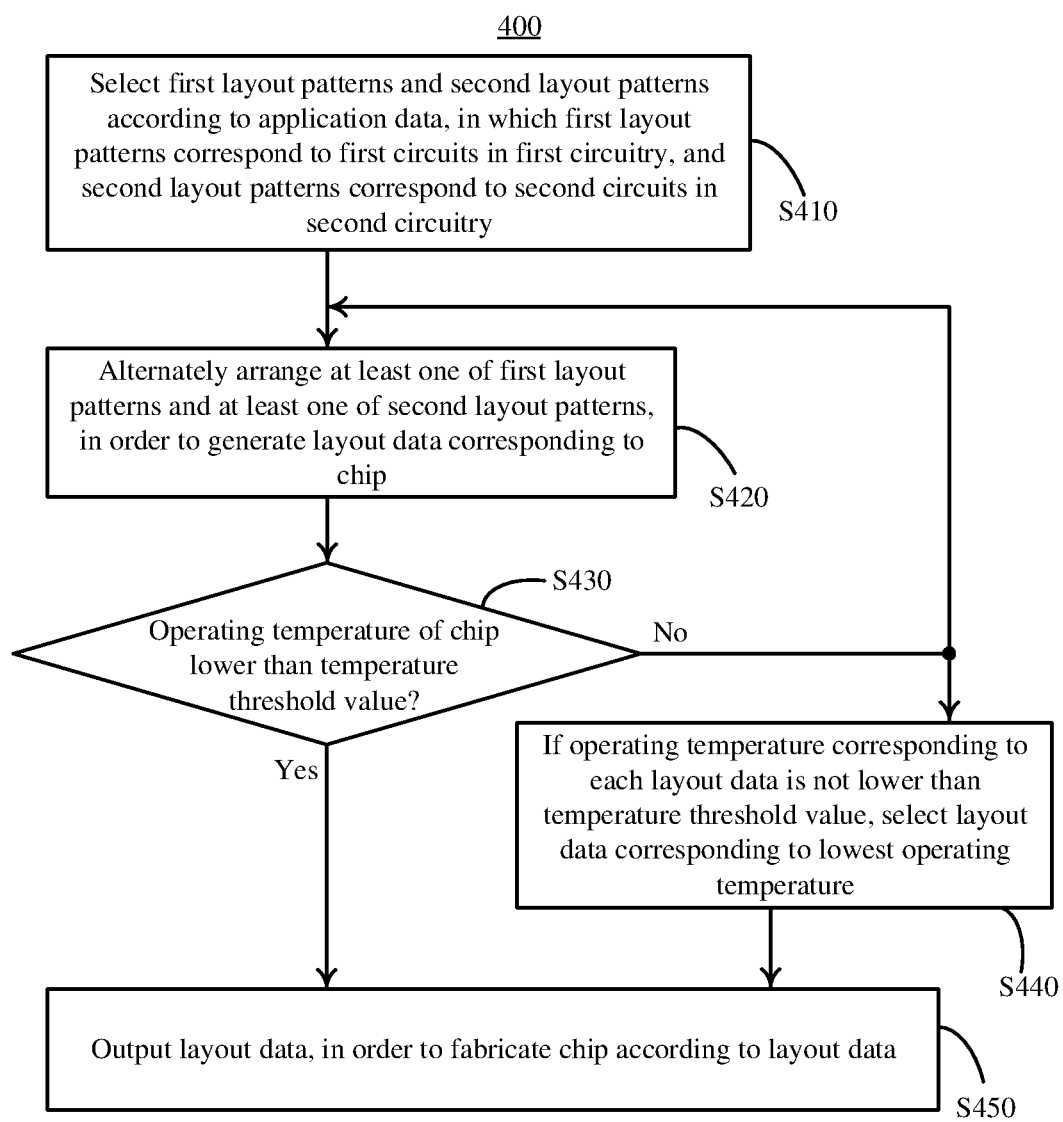
FIG. 4 is a flow chart of a layout design method according to some embodiments of the present disclosure.

In some embodiments, the at least one memory circuit 320 may be a non-transitory computer-readable storage medium, which stores executable instructions for performing operations in FIG. 4. In some embodiments, the non-transitory computer-readable storage medium may be an electronic, magnetic, optical, electromagnetic, infrared, and/or a semiconductor device. For example, the non-transitory computer-readable storage medium includes a semiconductor or solid-state memory, a magnetic tape, a removable computer diskette, a random-access memory (RAM), a read-only memory (ROM), a rigid magnetic disk, and/or an optical disk. In some other embodiments, the non-transitory computer-readable storage medium includes a compact disk-read only memory (CD-ROM), a compact disk-read/write (CD-R/W), and/or a digital video disc (DVD).

The at least one I/O interface 330 may receive various inputs or commands from various control devices that are manipulated by a circuit designer or a layout designer. Accordingly, the layout design system 300 may be controlled based on the commands received by the at least one I/O interface 330. In some embodiments, the at least one I/O interface 330 includes a monitor that configured to display a status of the program code being executed and/or the first layout data DL (or the at least one second layout data DL'). In some embodiments, the at least one I/O interface 330 includes a graphical user interface. In some other embodiments, the at least one I/O interface 330 may include a keyboard, a numeric keyboard, a mouse, a track ball, a touch screen, a cursor arrow keys, or any combination thereof, in order to transfer information and commands with the at least one processor circuit 310.

FIG. 4 is a flow chart of a layout design method 400 according to some embodiments of the present disclosure. In some embodiments, the layout design method 400 may be, but not limited to, performed by the layout design system 300 in FIG. 3. In operation S410, first layout patterns and second layout patterns are selected according to application data, in which the first layout patterns correspond to first circuits in a first circuitry, and the second layout patterns correspond to second circuits in a second circuitry.

In operation S420, at least one of the first layout patterns and at least one of the second layout patterns are alternately arranged, in order to generate layout data (e.g., the first layout data DL) corresponding to a chip.

In operation S430, whether an operating temperature of the chip is lower than a temperature threshold value is determined according to the layout data. If the operating temperature is lower than the temperature threshold value TH, operation S450 is performed. Alternatively, if the operating temperature is not lower than the temperature threshold value TH, operation S420 is performed again, in order to rearrange at least one portion of the first layout patterns and at least one portion of the second layout patterns, in order to generate new layout data (e.g., the at least one second layout data DL'). In operation S440, if the operating temperature corresponding to each layout data (e.g., the first layout data DL and the at least one second layout data DL') is not lower than the temperature threshold value TH, layout data corresponding to the lowest operating temperature is selected from these layout data.

In operation S450, the layout data is outputted, in order to fabricate the chip according to the layout data.

In order to illustrate the layout design method 400, reference is made to FIG. 5, and FIG. 5 is a schematic diagram showing a concept of operations in FIG. 4 according to some embodiments of the present disclosure. As shown in FIG. 5, the layout pattern database LD stores layout patterns corresponding to circuits, in which the layout patterns includes layout patterns (shown with horizontal stripes) corresponding to the circuits 111-118, layout patterns (shown with vertical stripes) corresponding to the circuits 121-124, and layout patterns (shown with diagonal stripes). In some embodiments, each of the layout patterns corresponding to the circuits may be an integrated circuit layout diagram that is expressed through two-dimensional shapes, which represent metal layer(s), semiconductor layer(s), isolation layer(s), contact(s), VIA(s), or the like. In some embodiments, the layout patterns of the circuits may be set in advance and stored in the at least one memory circuit 320 in FIG. 3.

According to the power consumption information D1, the power consumption D2, and the operation information D3, the at least one processor circuit 310 may acquire that, at the point of time T1, one of the circuitry 110 and the circuitry 120 has a high power consumption and another one of the circuitry 110 and the circuitry 120 has a low power consumption. Therefore, the at least one processor circuit 310 may select the layout patterns corresponding to the circuits 111-118 (i.e., the circuitry 110) and layout patterns corresponding to the circuits 121-124 (i.e., the circuitry 120) from the layout pattern database LD (i.e., operation S410).

Afterwards, the at least one processor circuit 310 may alternately arrange the layout patterns corresponding to the circuits 111-118 and the layout patterns corresponding to the circuits 121-124. For example, the layout pattern corresponding to the circuit 111, the layout pattern corresponding to the circuit 121, the layout patterns corresponding to the circuits 112-113, the layout pattern corresponding to the circuit 122, the layout patterns corresponding to the circuits 114-115, the layout pattern corresponding to the circuit 123, the layout patterns corresponding to the circuits 116-117, the layout pattern corresponding to the circuit 124, and the layout pattern corresponding to the circuit 118 are sequentially arranged along a direction of X in FIG. 5. Corresponding relations between the aforementioned layout patterns and the circuits 111-118 and 121-124 can be understood with reference to FIG. 1 or FIG. 2D. In some embodiments, after these layout patterns are arranged, the at least one processor circuit 310 may perform an automatic routing process according to the arranged layout patterns, in order to generate initial layout data (e.g., the first layout data DL). In some embodiments, the above operations may be referred to as an automatic planning procedure.

Furthermore, the at least one processor circuit 310 may run a circuit simulation according to the first layout data DL, in order to determine whether the operating temperature of the chip 100 is lower than the temperature threshold value TH (i.e., operation S430). For example, the at least one processor circuit 310 may run a post-layout simulation according to the first layout data DL, in order to determine whether the operating temperature of the chip 100 is lower than the temperature threshold value TH. As shown in FIG. 5, if the operating temperature is lower than the temperature threshold value TH, the at least one processor circuit 310 may output the first layout data DL, in order to fabricate the chip 100 according to the first layout data DL (i.e., operation S450). For example, the at least one processor circuit 310 may store the first layout data DL to the at least one memory circuit 320. A semiconductor fabrication plant may fabricate the chip 100 according to the first layout data DL.

Alternatively, if the operating temperature is not lower than the temperature threshold value TH, the at least one processor circuit 310 may re-arrange these layout patterns, in order to generate the at least one second layout data DL'. The at least one processor circuit 310 may run the circuit simulation according to the at least one second layout data DL', in order to determine whether the operating temperature of the chip 100 is lower than the temperature threshold value TH. For example, the at least one processor circuit 310 may arrange more layout patterns corresponding to circuits having lower power consumption to be between the layout patterns corresponding to circuits having higher power consumption, in order to generate the at least one second layout data DL'. As a result, more circuits having lower power consumption are able to operate as heat sinks for circuits having high power consumption, in order to lower the operating temperature. In some embodiments, if the operating temperature corresponding to each of the at least one second layout data DL' is not lower than the temperature threshold value TH, the at least one processor circuit 310 selects layout data corresponding to a lowest operating temperature in the first layout data DL and the at least one second layout data DU (i.e., operation S440), in order to fabricate the chip 100 according to the selected layout data (i.e., operation S450). As a result, a number of heat sinks required by the chip 100 can be reduced.

In some embodiments, the layout design system 300 and/or the layout design method 400 may be performed with aided-design tool(s) in the industry, in order to generate the first layout data DL or the at least one second layout data DU. For example, aided-design tool(s) may include, but not limited to, Synopsys IC Compiler, Cadence Innovus, and so on.

The above operations of the layout design method 400 can be understood with reference to various embodiments discussed above, and thus the repetitious descriptions are not given. The above description of the layout design method 400 includes exemplary operations, but the operations are not necessarily performed in the order described above. Operations of the layout design method 400 may be added, replaced, changed order, and/or eliminated as appropriate, or the operations are able to be executed simultaneously or partially simultaneously as appropriate, in accordance with the spirit and scope of various embodiments of the present disclosure.

As described above, with the chip, the layout design system, and the layout design method provided in some embodiments of the present disclosure, a floorplan layout diagram of a chip can be automatically generated based on layout constraint(s) (which may include temperature threshold value, operating state, and so on). As a result, certain circuits in the chip can operate as a heat sink in practical applications, in order to prevent the operating temperature of the chip from getting too high, and to reduce the number of additional heat sink(s).

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A layout design system, comprising:
    at least one memory circuit configured to store at least one program code, a temperature threshold value, and application data; and
    at least one processor circuit configured to perform the at least one program code to:
        select a plurality of first layout patterns and a plurality of second layout patterns according to the application data, wherein the plurality of first layout patterns correspond to a plurality of first circuits in a first circuitry, and the plurality of second layout patterns correspond to a plurality of second circuits in a second circuitry;
        alternately arrange at least one of the plurality of first layout patterns and at least one of the plurality of second layout patterns, in order to generate first layout data corresponding to a chip;
        determine whether an operating temperature of the chip is lower than the temperature threshold value according to the first layout data; and
        if the operating temperature is lower than the temperature threshold value, output the first layout data, in order to fabricate the chip according to the first layout data.

2. The layout design system of claim 1, wherein the application data comprises first power consumption information and second power consumption information, the first power consumption information indicates first power consumption of the plurality of first circuits at a point of time, the second power consumption information indicates second power consumption of the plurality of second circuits at the point of time, and the first power consumption is higher than the second power consumption.

3. The layout design system of claim 1, wherein the at least one processor circuit is further configured to:
    rearrange the plurality of first layout patterns and the plurality of second layout patterns if the operating temperature is not lower than the temperature threshold value, in order to generate at least one second layout data corresponding to the chip; and
    if the operating temperature of the chip corresponding to each of the at least one second layout data is not lower than the temperature threshold value, output one, which corresponds to a lowest temperature, of the first layout data and the at least one second layout data, in order to fabricate the chip.

4. The layout design system of claim 1, wherein the first circuitry is a first receiver circuitry coupled to a first transmission interface, the second circuitry is a second receiver circuitry coupled to a second transmission interface, and the first transmission interface is different from the second transmission interface.

5. The layout design system of claim 4, wherein one of the first transmission interface and the second transmission interface is a V-by-One interface, and another one of the first transmission interface and the second transmission interface is a high definition multimedia interface.

6. The layout design system of claim 4, wherein the plurality of first circuits are coupled to a plurality of lanes in the first transmission interface respectively, and the plurality of second circuits are coupled to a plurality of lanes in the second transmission interface respectively.

7. The layout design system of claim 1, wherein the application data comprises operation information, the operation information indicates that when the first circuitry operates at a point of time, the second circuitry does not operate at the point of time, or indicates that both of the first circuitry and the second circuitry operate at the point of time.

8. A layout design method, comprising:
    selecting a plurality of first layout patterns and a plurality of second layout patterns according to application data, wherein the plurality of first layout patterns correspond to a plurality of first circuits in a first circuitry, and the plurality of second layout patterns correspond to a plurality of second circuits in a second circuitry;
    alternately arranging at least one of the plurality of first layout patterns and at least one of the plurality of second layout patterns, in order to generate first layout data corresponding to a chip;
    determining whether an operating temperature of the chip is lower than a temperature threshold value according to the first layout data; and
    if the operating temperature is lower than the temperature threshold value, outputting the first layout data, in order to fabricate the chip according to the first layout data.

9. The layout design method of claim 8, wherein the application data comprises first power consumption information and second power consumption information, the first power consumption information indicates first power consumption of the plurality of first circuits at a point of time, the second power consumption information indicates second power consumption of the plurality of second circuits at the point of time, and the first power consumption is higher than the second power consumption.

10. The layout design method of claim 8, wherein the application data comprises operation information, the operation information indicates that when the first circuitry operates at a point of time, the second circuitry does not operate at the point of time, or indicates that both of the first circuitry and the second circuitry operate at the point of time.

11. The layout design method of claim 8, wherein the first circuitry is a first receiver circuitry coupled to a first transmission interface, the second circuitry is a second receiver circuitry coupled to a second transmission interface, and the first transmission interface is different from the second transmission interface.

12. The layout design method of claim 11, wherein one of the first transmission interface and the second transmission interface is a V-by-One interface, and another one of the first transmission interface and the second transmission interface is a high definition multimedia interface.

13. The layout design method of claim 8, wherein the plurality of first circuits are coupled to a plurality of lanes in a first transmission interface respectively, and the plurality of second circuits are coupled to a plurality of lanes in a second transmission interface respectively.

14. The layout design method of claim 8, further comprising:
- rearranging the plurality of first layout patterns and the plurality of second layout patterns if the operating temperature is not lower than the temperature threshold value, in order to generate at least one second layout data corresponding to the chip; and
- if the operating temperature of the chip corresponding to each of the at least one second layout data is not lower than the temperature threshold value, outputting one, which corresponds to a lowest temperature, of the first layout data and the at least one second layout data, in order to fabricate the chip.

* * * * *